United States Patent [19]
Langner

[11] Patent Number: 5,315,175
[45] Date of Patent: May 24, 1994

[54] QUASI-DIFFERENTIAL BUS

[75] Inventor: Paul A. Langner, Nepean, Canada

[73] Assignee: Northern Telecom Limited, Montreal, Canada

[21] Appl. No.: 33,222

[22] Filed: Mar. 18, 1993

[51] Int. Cl.$^5$ .................................. H03K 14/003
[52] U.S. Cl. .................................. 307/443; 307/354; 307/475; 375/76
[58] Field of Search .............. 307/443, 446, 475, 354, 307/363; 775/76

[56] References Cited

U.S. PATENT DOCUMENTS

| | | | |
|---|---|---|---|
| 4,859,877 | 8/1989 | Cooperman et al. | 307/443 |
| 4,994,690 | 2/1991 | Sundstrom et al. | 307/443 |
| 5,003,467 | 3/1991 | Donaldson et al. | 307/443 X |
| 5,019,228 | 5/1991 | Sanwo et al. | 307/475 |
| 5,056,110 | 10/1991 | Fu et al. | 307/443 X |
| 5,220,211 | 6/1993 | Christopher et al. | 307/475 X |

OTHER PUBLICATIONS

"MECL System Design Handbook", 4th Ed., William R. Blood, Jr., Motorola Semiconductor Products, Inc., 1988, pp. 70–76.

Primary Examiner—David R. Hudspeth
Attorney, Agent, or Firm—Dallas F. Smith

[57] ABSTRACT

A digital data bus provides common-mode noise immunity equal to approximately one-half that of a fully differentially driven and received bus. For a data bus having n data lines, n+1 lines are provided, the n+1th line being a reference voltage line. The data and reference lines are driven by drivers having similar impedance characteristics. The reference line is received by a line receiver having impedance characteristics similar to the differential receivers of the data lines. The data line receivers have one differential input connected to respective data lines and the other differential input connected to the output of the reference line receiver. The reference line is routed with the data lines to ensure induced signals are common-mode, but spaced therefrom to reduce cross-talk.

5 Claims, 1 Drawing Sheet

QUASI-DIFFERENTIAL BUS

This invention relates to digital data busses and is particularly concerned with data busses having single-ended drivers and differential receivers.

Reference is directed to a copending U.S. patent application filed on the same day as this application and entitled "Digital Driver with Class AB Output Stage", Ser. No. 033,221, by Lawrence H. Sasaki and Anthony K. D. Brown, the entire disclosure of which is hereby incorporated by reference.

BACKGROUND OF THE INVENTION

To reliably transmit binary digital data between a source point and a destination point, it is necessary to provide the destination with a means of determining when the data has changed state. When the two states in a binary digit scheme are represented by different voltage levels, typically the destination compares the received signal to a reference voltage. Usually, this reference voltage is implicit as it is derived from a common ground connection. However, in cases where the ground is not common, or where there are significant DC offsets in the ground, it is necessary for the source to transmit a reference level to the destination. This may also be necessary where AC noise is present on the ground and power planes. Typically, to transmit a reference signal from the source to the destination, a differential scheme is used. In a differential scheme, the binary complement of the signal is sent along with the signal. At the destination the signal can be compared to its complement and the two states resolved.

It is well known to use differential line drivers and differential receivers in high-speed data busses. The connection between drivers and receivers can be provided by twisted pairs that are in cable or ribbon form. Flat ribbon cable may be used in single-ended fashion with every other conductor grounded at both the driver and the receiver end. The above is described in "MECL System Design Handbook" 4th Ed., William R. Blood, Jr., Motorola Semiconductor Products, Inc., 1988, pp 70–76. While the noise immunity of differentially driven and received twisted pair cable is well known and very desirable, it comes at the expense of having to provide two lines for each data line in the bus.

SUMMARY OF THE INVENTION

An object of the present invention is to provide an improved digital data bus.

In accordance with the present invention there is provided a digital data bus comprising: a plurality of line drivers, each for accepting a data signal to be transmitted on the bus; a plurality of data lines, each connected at a first end to the output of a respective one of the line drivers; a plurality of differential line receivers, each connected via one of its differential inputs to a second end of a respective one of the data lines; a reference signal line driver having impedance characteristics similar to those of the plurality of line drivers; a reference signal line connected at a first end to the output of the reference signal line driver; and a reference signal line receiver having impedance characteristics similar to those of the plurality of line receivers and having an input connected to the second end of the reference signal line and an output connected to each of the plurality of differential line receivers via the other of the differential inputs.

In an embodiment of the present invention the line drivers are $0.8\mu$ BiCMOS.

An advantage of the present invention is providing approximately one-half the common-mode noise immunity of differential bussing using one extra bus line.

BRIEF DESCRIPTION OF THE DRAWINGS

The present invention will be further understood from the following description with reference to the drawings in which.

DETAILED DESCRIPTION

Figure 1:
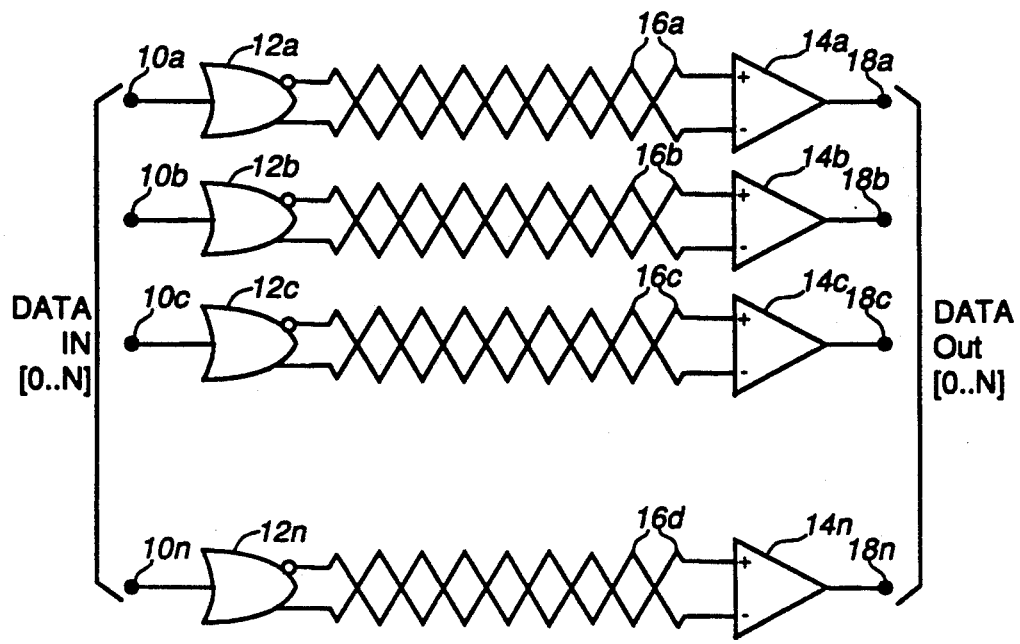
FIG. 1 schematically illustrates a known digital data bus arrangement.

Referring to FIG. 1, there is schematically illustrated a known digital data bus arrangement. The digital bus includes data inputs $10a$ through $10n$, for inputting the digital data signals, DATAIN [0 ... N], differential line drivers $12a$ through $12n$ connected to inputs $10a$ through $10n$, respectively, differential receivers $14a$ through $14n$ connected to the differential line drivers $12a$ through $12n$, respectively, via twisted pairs $16a$ through $16n$, respectively, and outputs $18a$ through $18n$ connected to the differential receivers $14a$ through $14n$, respectively. The line drivers and line receivers may be, for example, MC10109 and MC10115, respectively, by Motorola.

In operation, the data signals DATAIN [0 ... N] applied to inputs $10a$ through $10n$, are transmitted via each respective twisted pair $16a$ through $16n$, as a data signal and its complement, to the differential receivers $14a$ through $14n$, to be provided at outputs $18a$ through $18n$ as DATAOUT [0 ... N]. The arrangement of FIG. 1 is well known to have high noise immunity, however for N data lines, where N is an integer, there must be provided 2N lines between the differential line drivers 12 and the differential line receivers.

Figure 2:
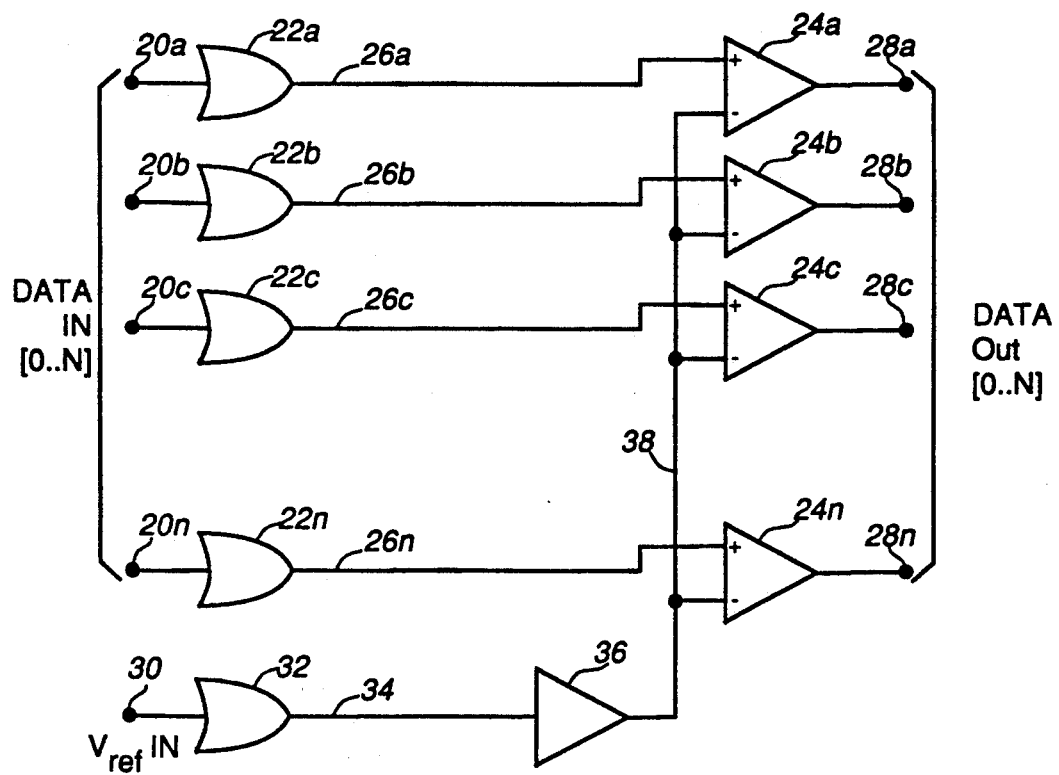
FIG. 2 schematically illustrates a digital data bus arrangement in accordance with an embodiment of the present invention.

Referring to FIG. 2, there is schematically illustrated a digital data bus arrangement in accordance with an embodiment of the present invention. The digital bus includes data inputs $20a$ through $20n$, for inputting the digital data signals, DATAIN [0 ... N], line drivers $22a$ through $22n$ connected to inputs $20a$ through $20n$, respectively, differential receivers $24a$ through $24n$, each having an input connected to the line drivers $22a$ through $22n$, respectively, via bus lines $26a$ through $26n$, respectively, outputs $28a$ through $28n$ connected to the differential receivers $24a$ through $24n$, respectively, and a reference voltage input 30 connected to a return signal line driver 32 which is in turn connected to a reference signal line 34, and at a reference signal line receiver 36 connected to the other inputs of differential receivers $24a$ through $24n$, via a line 38.

In operation, the data signals DATAIN [0 ... N] applied to inputs $20a$ through $20n$, are transmitted via each respective line $26a$ through $26n$, as a data signal to one input of the differential receivers $24a$ through $24n$. The other input of differential receivers 24 receives a reference voltage signal, $V_{ref}$, which has been provided on the reference signal line 34 by the reference signal line driver 32 and received by the reference signal line receiver 36. As the reference voltage signal, $V_{ref}$, is routed along with the other bus lines $26a$ through $26n$, any common mode noise induced on the data bus signal lines is also induced on the reference signal line 34. The high common mode rejection of the differential receivers 24a through 24n is then used in the quasi-differential bus of FIG. 2 to recover the data signal with common mode noise immunity of about one-half that of the fully differential bus of FIG. 1. The arrangement of FIG. 1 is well known to have high noise immunity, however for N data lines, where N is an integer, there must be provided 2N lines between the differential line drivers 12 and the differential line receivers.

In order to ensure that the noise signal in the reference signal line 34 undergoes the same reflections as the corresponding noise signals in the data bus lines 26a through 26n, the reference signal line driver 32 and the reference signal line receiver 36 have the same impedance characteristics as data line drivers 22a through 22n and data line receivers 24a through 24n, respectively. The reference signal line 34 is routed with the data bus lines 26a through 26n to ensure common mode noise, but spaced therefrom to reduce crosstalk. The arrangement of FIG. 2 is particularly suited to drivers of the source or emitter follower type, and differential amplifier receivers.

For a particular embodiment of the present invention a 0.8μ BiCMOS line driver, disclosed in the above-referenced and incorporated copending application, is well suited to single-ended terminated driving.

Numerous modifications, variations and adaptations may be made to the particular embodiments of the invention described above without departing from the scope of the invention, which is defined in the claims.

What is claimed is:

1. A digital data bus comprising:
   a plurality of line drivers, each for accepting a data signal to be transmitted on the bus;
   a plurality of data lines, each connected at a first end to the output of a respective one of the line drivers;
   a plurality of differential line receivers, each connected via one of its differential inputs to a second end of a respective one of the data lines;
   a reference signal line driver having impedance characteristics similar to those of the plurality of line drivers;
   a reference signal line connected at a first end to the output of the reference signal line driver; and
   a reference signal line receiver having impedance characteristics similar to those of the plurality of line receivers and having an input connected to the second end of the reference signal line and an output connected to each of the plurality of differential line receivers via the other of the differential inputs.

2. A bus as claimed in claim 1 wherein the line drivers are source followers.

3. A bus as claimed in claim 1 wherein the line drivers are emitter followers.

4. A bus as claimed in claim 1 wherein the differential line receivers are emitter coupled.

5. A bus as claimed in claim 1 wherein the line drivers are 0.8μ BiCMOS.

* * * * *